July 26, 1949.  M. N. FAIRBANK  2,477,291
SELF-DEVELOPING MAGAZINE CAMERA
Filed June 25, 1948  2 Sheets-Sheet 1
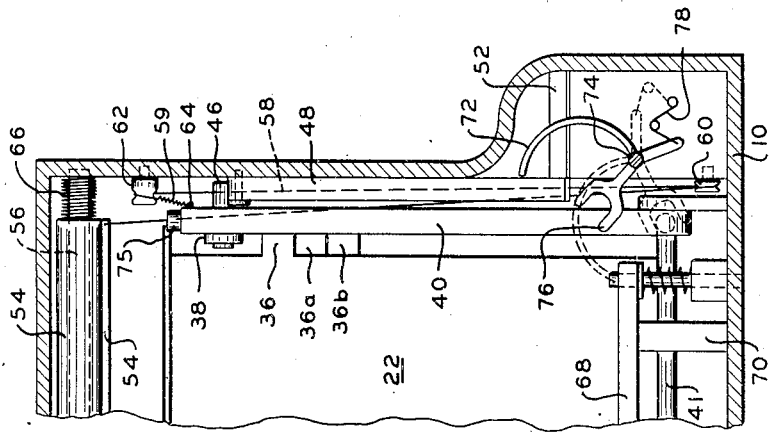
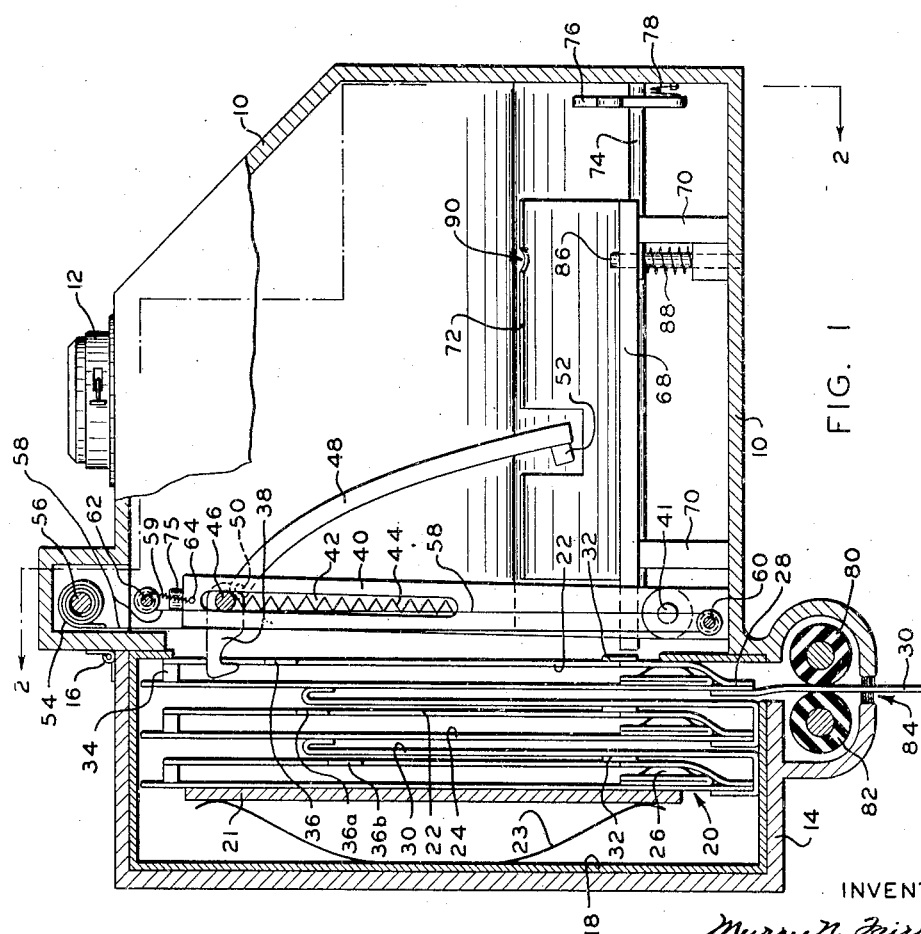
INVENTOR
Murry N. Fairbank
BY Donald L. Brown
and Oliver H. Hayes
Attorneys July 26, 1949. M. N. FAIRBANK 2,477,291
SELF-DEVELOPING MAGAZINE CAMERA Filed June 25, 1948 2 Sheets-Sheet 2

INVENTOR
Murry N. Fairbank
BY Donald C. Brown
and
Oliver W. Hayes
Attorneys

Patented July 26, 1949

2,477,291

UNITED STATES PATENT OFFICE 2,477,291

SELF-DEVELOPING MAGAZINE CAMERA

Murry N. Fairbank, Belmont, Mass., assignor to Polaroid Corporation, Cambridge, Mass., a corporation of Delaware Application June 25, 1948, Serial No. 35,179

12 Claims. (Cl. 95—13)

This invention relates to photography and more particularly to novel photographic apparatus, such as a camera, of the type described and claimed in the copending application of Edwin H. Land, Serial No. 35,142, filed June 25, 1948, for Photographic apparatus. Cameras of the type described in the above-mentioned copending application are particularly designed for use with photographic film units comprising a photosensitive layer carried by a base sheet, an image-carrying sheet superposed therewith and a container positioned for discharge of a contained processing liquid between said sheets. Such a camera includes means for holding one of the sheets stationary in the camera, means for moving the other sheet out of superposition with the held sheet so as to permit exposure of the photosensitive layer carried by one of the shields, and means for processing the exposed photosensitive layer by passing said unit between a pair of pressure members which release the processing liquid from the container and spread this liquid between two sheets.

A principal object of the present invention is to provide a camera of the above type wherein improved means are provided for handling the film units in the camera.

Another object of the present invention is to provide a camera of the above type including means for preventing fogging of the photosensitive layer due to light reflected from the image-carrying sheet.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic exaggerated sectional view of one preferred form of camera embodying the invention;

Fig. 2 is a diagrammatic fragmentary sectional view of Fig. 1 taken along the line 2—2;

Figures 3, 4:
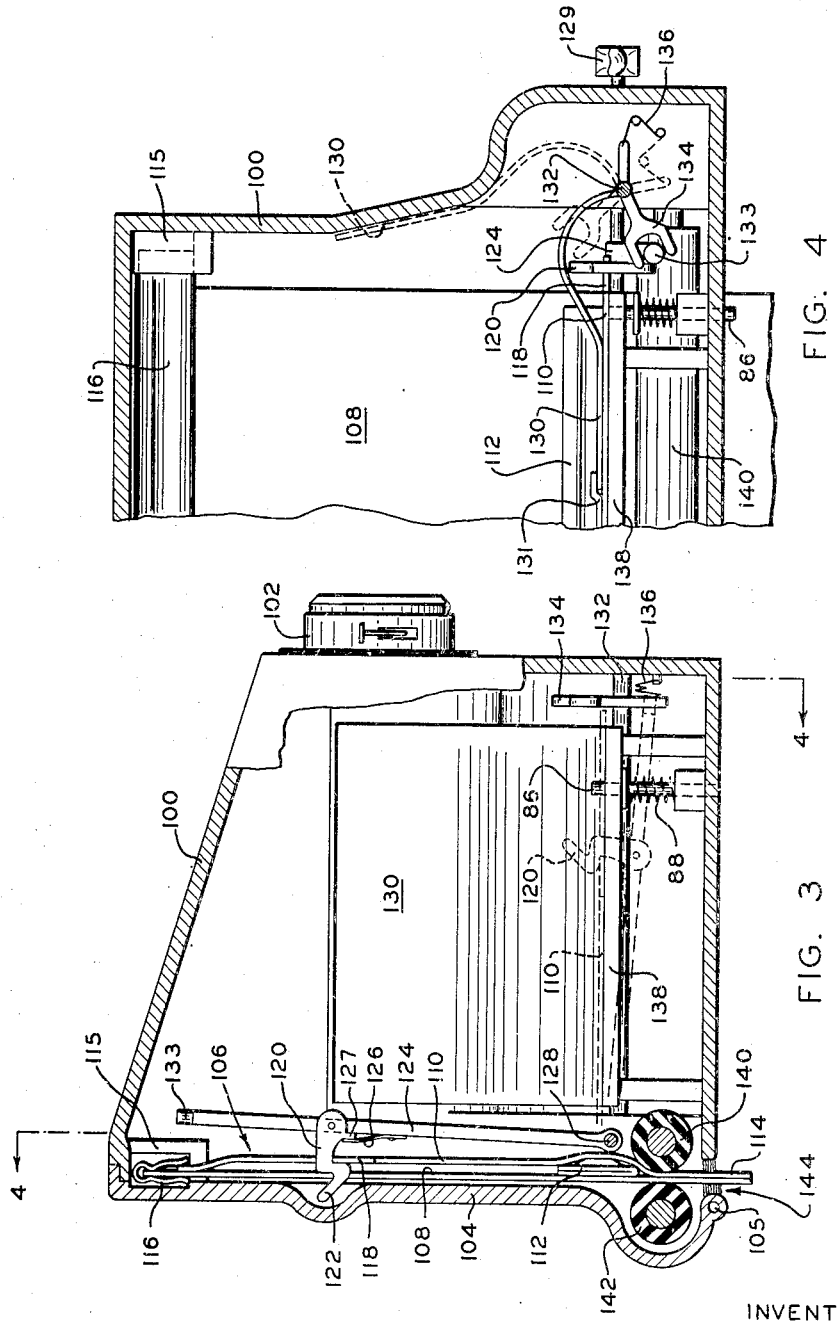
Fig. 3 is a diagrammatic exaggerated sectional view of another form of the invention.
Fig. 4 is a diagrammatic fragmentary sectional view of Fig. 3 taken along line 4—4, with the sheet-moving means in a different position.

In general this invention relates to camera apparatus, of the type mentioned above, particularly adapted for use with novel film units comprising a photosensitive sheet including a photosensitive silver halide layer carried by a base sheet, an image-carrying sheet superposed with the photosensitive layer and a container positioned between the two sheets adjacent an area of the photosensitive layer adapted to be exposed to light. These two sheets lie on opposite sides of the photosensitive layer and preferably include opaque strata so as to prevent actinic light from reaching the photosensitive area when the two sheets are superposed. One of the sheets is hingedly connected to the other sheet so as to be swung out of superposition therewith to permit exposure of the photosensitive layer carried by one of the sheets. In a preferred form of the invention the image-carrying sheet comprises a light, preferably white, surface particularly adapted to have formed thereon a positive image comprising silver.

This invention relates primarily to the apparatus for handling such a film unit so as to obtain the exposure of the photosensitive layer while preventing fogging thereof by any light reflected from the white surface of the image-carrying layer. A preferred form of the camera includes means for holding such a film unit while the photosensitive sheet and the image-carrying sheet are in superposed relation. There are also provided means for engaging a portion of one of the two sheets of the film unit and for swinging said engaged sheet out of superposition with the other sheet while this other sheet remains stationary. For exposing the photosensitive layer when the sheets are out of superposition there is provided an exposure opening in the camera such as a usual lens and shutter. In addition, means are provided for preventing light from striking the image-carrying sheet and being reflected towards the photosensitive sheet. The last-mentioned means preferably comprises a light-shielding means including a nonreflecting screen positionable between the image-carrying sheet and the lens or other exposure means to prevent light, which passes through the exposure means, from reaching the image-carrying sheet. For processing the exposed film unit, there is provided a processing means preferably comprising a pair of pressure-applying surfaces mounted adjacent the above-mentioned holding means, these pressure-applying surfaces being adapted to compress the film unit during advancement thereof between said surfaces so as to release the processing liquid carried by the container and to spread said liquid between facing surfaces of the exposed photosensitive sheet and the image-carrying sheet.

In one preferred form of the invention, the film unit is held in the camera in such a position that the photosensitive sheet thereof may be engaged by a means in the camera and swung from its normal position into the focal plane of the camera while the image-carrying sheet is held stationary. In this form of the invention, the non-reflecting screen is preferably so arranged as to be moved into superposition with the stationarily held image-carrying sheet as a result of movement of the photosensitive sheet into the focal plane. Such a form of the invention is shown in Figs. 1 and 2 which illustrate one preferred type of handheld camera embodying the invention and which is particularly adapted for handling a plurality of film units in a magazine therefor. In these figures, a camera body 10 carries a lens and shutter assembly 12. A magazine holder 14 is preferably pivotally connected to the camera body as at 16 and holds a magazine 18, shown as containing a plurality of film units 20. The preferred type of film unit for use in the present invention comprises a photosensitive sheet 22, an image-carrying sheet 24 and a container 26 secured to sheet 24 and having therein a processing liquid. The two sheets of the film unit preferably are joined together as at 28 and a leader 30 is included for connecting one film unit to the succeeding film unit. Each film unit preferably includes a trap 34 positioned at the opposite end of the film unit from the container, this trap being secured to sheet 24, for example, and having the function of trapping excess liquid released and spread from the container 26. Each photosensitive sheet 22 is preferably hingedly connected, as at 32, to the remainder of the film unit and each photosensitive sheet 22 also preferably includes portions adapted to be engaged by a means in the camera for swinging this sheet from its held position to the focal plane. In a preferred form, these portions comprise a pair of tabs 36 on each photosensitive sheet, these tabs being adapted to be engaged by a means, such as a pair of hooks 38. The tabs in each film unit are preferably lower than the tabs in the preceding film unit. Thus tabs 36a, associated with the second film unit, are lower than tabs 36, and tabs 36b, associated with the third film unit, are lower than tabs 36a. A backing plate 21 and a spring 23 are preferably included in magazine 18 for urging successive film units to the front of the magazine.

Each of the hooks 38 is carried by an arm 40 secured to a rod 41, this rod being provided with a suitable handle (not shown). Each arm 40 has a slot 42 therein, each hook 38 being free to travel up and down in the slot 42, its downward motion being accomplished by a weak spring 44 and its upward motion being accomplished by a cam follower 46. Each cam follower 46 is controlled by a cam 48 pivoted around a pin 50. The arm shown in Fig. 1 is the near arm, while the cam 48 is the far cam, the near cam being omitted from Fig. 1 for clarity of illustration. The cam 48 is free to rotate around the pin 50 to the right, as seen in Fig. 1, but is unable to rotate to the left due to a stop 52. A spring (not shown) normally biases the cam 48 to the left and into the position shown in Fig. 1.

In the form of the invention shown in Figs. 1 and 2, the non-reflecting screen comprises, for example, a cloth screen indicated at 54 as being rolled up on a spindle 56. For unrolling screen 54 there is provided a moving means which, in a preferred form, may have resilient portions. Such unrolling means are shown as a pair of tapes or bands 58 which pass downwardly along the edges of the magazine to a pair of pulleys 60 at the bottom of the camera. Bands 58 pass around these pulleys 60, back to the top of the camera and around another pair of pulleys 62, the ends of the bands 58 being connected, through a resilient section 59, to a stud 64 near the upper end of arm 40. A spring 66 (Fig. 2) is provided on the screen-carrying spindle 56 for the purpose of normally maintaining the screen in the rolled up condition shown.

For holding the photosensitive sheet 22 flat in the focal plane of the camera, there is provided a backing plate 68 supported by means such as rods 70. For clamping the edges of the photosensitive sheet while it is supported on backing plate 68, there is included a holding clamp 72 mounted on a pivoted rod 74. An arm 76 on the end of rod 74 is adapted to be engaged by a stud 75 on the end of swinging arm 40. A spring 78 biases the clamp 72 in either the dotted line or full line position shown in Fig. 2.

For processing the exposed photosensitive sheet, there is provided a processing means comprising, in the preferred form, a pair of pressure rolls 80 and 82, pressure roll 80 being preferably supported by the camera housing 10 and pressure roll 82 being preferably supported by the magazine holder 14. These rolls are thus separated when the magazine holder is moved with respect to the camera housing for insertion of the magazine. Adjacent the pressure rolls 80—82, and exteriorly thereof, there is preferably provided a light-tight discharge opening 84 through which the processed film unit may be advanced from the camera.

In the use of the camera shown in Figs. 1 and 2, the magazine holder 14 is swung to the left around pivot 16, carrying roll 82 therewith. The magazine 18 is then inserted in the holder 14 and the leader 30, associated with the first film unit, is placed over roll 82. The magazine is then swung to closed position and that portion of the leader extending from the opening 84 is pulled to remove a cover sheet from the magazine. The camera is now loaded and ready for use. In the operation of the camera, assume that the arm 40 is in the position shown in Fig. 2, with the cam follower 46 just about to reach the end of the cam 48. When the arm 40 is rotated slightly to the left of the position shown, hook 38 is moved above and in position to engage the tab 36 associated with the first photosensitive sheet 22 in the magazine. This movement of arm 40 to the left causes the cam follower 46 to pass off the end of cam 48 and allows the spring 44 to pull the hook 38 down into engagement with the topmost tab in the magazine, i. e., the tab associated with the foremost film unit. When the hook 38 has engaged tab 36, the arm 40 is swung to the right, the cam follower 46 moving the cam 48 to the side and passing beyond the end thereof. As a result of swinging of arm 40, the bands 58, secured to the end thereof at 64, are placed under tension. Movement of bands 58 causes the screen 54 to be unrolled from the spindle 56 and to be moved into superposition with the image-carrying sheet held in the magazine 18. By the time the arm 40 is swung completely to the right of Fig. 1, screen 54 will have been fully unrolled so as to prevent any reflection of light from the surface of the image-carrying sheet 24.

Movement of arm 40 brings the photosensitive sheet 22 down onto the backing plate 68 where it is located in the focal plane of the camera. During the latter part of the travel of arm 40, stud 75 carried by the end thereof engages and rotates arm 76 associated with the clamp-operating rod 74. The rotation of arm 76 from the full line position of Fig. 2 to the dotted line position causes the clamp 72 to move from the full line position to the dotted line position, thereby clamping the edge of the photosensitive sheet and holding this sheet flat in the focal plane.

Exposure of the photosensitive sheet 22 is now accomplished by suitably operating the shutter mechanism 12. Clamp 72 is then released, such as by moving the arm 40 upwardly sufficiently to move the arm 76 into the full line position shown in Fig. 2. The film unit is then processed by pulling on the leader 30 to cause the passage of the film unit between the pressure rolls so as to release the liquid from container 26 and to spread this liquid between the two sheets of the film unit.

When the arm 40 moves back to engage the next pair of tabs on the succeeding photosensitive sheet, cam follower 46 engages the right-hand side of the swinging cam 48 and travels along the right-hand side thereof until it assumes the position shown in Fig. 1. This movement of the cam follower during the return stroke of arm 40 raises the hook 38 so that it will be in position to drop down and engage the highest tab remaining in the film pack and thus be able to move the next succeeding photosensitive sheet into the focal plane of the camera.

The camera of Figs. 1 and 2 also preferably includes means for indicating the presence of the photosensitive sheet on the backing plate 68 so that, in case of faulty operation of the hooks or the swinging arm, this fact will be indicated to the camera user. This indicating means comprises, in one preferred form, a rod 86 which extends through the camera housing 10, this rod being slightly longer than the distance from the top of plate 68 to the bottom of the outside of the housing 10. Rod 86 is normally biased upwardly by a weak spring 88 so that the lower end of rod 86 does not normally protrude from the camera housing. When the photosensitive sheet is moved to the focal plane, it engages the upper end of rod 86 and pushes the rod downwardly. A relieved portion 90 of the clamp 72 is provided so that movement of the clamp 72 to the dotted line position of Fig. 2 will not actuate the rod 86 unless there is a photosensitive sheet lying on plate 68.

In a preferred form of camera embodying the features shown in Figs. 1 and 2, the rolls 80—82 may be made of rubber, metal or plastic and they may have a fixed spacing or be under a spring load. The rolls may have spacing rollers associated therewith, or spacing strips may, if desired, be included on the surface of one or both of the sheets of the film unit. The film unit preferably comprises a usual silver halide emulsion which is coated on a paper or other suitable carrier and which preferably has an opaque backing. The photosensitive layer need not be, and, for economy sake, may not be, coextensive with the total area of the photosensitive sheet 22. The image-carrying sheet may, for example, be a sheet of baryta paper in which case it may have a stiffening backing such as cardboard.

When a positive image is desired on the surface of the baryta image-carrying sheet, the liquid in container 26 may comprise an aqueous viscous alkaline solution of a developer and a silver halide solvent which is capable of developing a negative in the photosensitive sheet and of forming a positive thereof on the surface of the image-carrying sheet.

While one preferred engaging means has been shown in Figs. 1 and 2 it is subject to considerable modification within the scope of the invention. It may, for example, comprise a pressure-sensitive adhesive strip secured to the end of arm 40 in place of hook 38. It may be a suction cup or a thumb tack, for example, mounted on arm 40. Equally, the portion of film unit 20 to be engaged may be considerably modified from the form shown. It may comprise a metal strip, a loop of wire or string, or a protruding rivet, etc., in which case the engaging means, carried by arm 40, is suitably modified to meet the requirements of the particular case.

The nonreflecting screen 54 and the means for actuating this screen may be subject to considerable modifications without departing from the scope of the invention. For example, in the modification shown, the screen 54 is unrolled during operation till the leading end thereof reaches that portion of the photosensitive sheet 22 which is supported by backing plate 68, further movement of the screen 54 being positively prevented by the backing plate 68 and the further travel of the arm 40 merely stretching the resilient portion 59 of band 58. This control of the movement of screen 54 may be readily accomplished in numerous other ways such as providing a screen which is only long enough to reach to plate 68. Additionally, it is quite feasible to provide a lost motion mechanism as a part of the screen-actuating means so that movement of the screen, for example, may not commence until after considerable movement of the arm 40 or so that movement of the screen may stop after a predetermined movement of the arm 40. In still another modification of the invention, pulley 60 may be placed slightly above the end of plate 68 so that the end of screen 54 may pass around pulley 60 and, for the latter part of movement of arm 40, the leading end of screen 54 may travel upwardly.

In still another modification of the invention, the screen 54 may be made so that it can be pushed into position instead of being pulled. In this case, the leading end of screen 54 is pushed down into position by rotation of the spindle 56, the band 58 being conveniently connected to spindle 56 to cause this rotation. Suitable other drive mechanisms may be employed, such as a gear train, for example, driving a spindle positioned in lieu of pulley 60, this gear train being driven as a result of rotation of arm 40. Additionally, in less preferred forms of the invention, the screen 54 may be pulled down by means such as a spring, which spring is released from a catch so as to be rendered effective at some part of the travel of the arm 40. Such releasing of the spring may be accomplished, for example, as by having the catch actuated by rotation of rod 74. Such a spring may be rewound manually or may be rewound, for example, by rotation of rolls 80—82.

In still another and less preferred form of the invention, the screen 54 may be independently operated or may be operated incidentally to some other operation of the camera, for example, the operation of the shutter mechanism.

In the various modifications of the invention described above, the screen 54 may have the additional function of preventing actinic light from passing around the edges of image-carrying sheet 22 and thus obviates the danger of fogging the photosensitive sheets remaining in the magazine.

Referring now to Figs. 3 and 4, there is shown another modification of the invention wherein the image-carrying sheet is moved from superposition with the photosensitive sheet and wherein the non-reflecting screen is moved into superposition with the image-carrying sheet during the latter part of travel thereof. In these figures, 100 represents the camera body, this body supporting a lens and shutter 102, and having rear door 104 pivotally secured to the housing as at 105. The film unit is shown generally at 106 and comprises a photosensitive sheet 108, an image-carrying sheet 110 and a container 112, sheets 108 and 110 preferably being secured together as at 114 to provide a leader for the film unit. A clip 116 is preferably provided for holding the film unit in the camera and for maintaining the image-carrying sheet normally in superposed relation with the photosensitive sheet. A clip-holding means, comprising a pair of lugs 115, is provided on the camera body for holding the clip 116, lugs 115 and rear door 104 cooperating to hold the photosensitive layer flat in the focal plane of the camera. A pair of tabs 118 are preferably formed integrally with the image-carrying sheet 110, these tabs 118 being adapted to be engaged by means in the camera for moving sheet 110 from superposition with the photosensitive sheet. This engaging means, in one preferred form, comprises a pair of hooks 120 carried by a pair of arms 124. A spring 126 engages a lug 127 on hook 120 and thus normally biases each hook 120 into the position shown. Hook 120 has a tapered end portion 122 which is of assistance in swinging the hook over and behind tab 118. For swinging the arms 124, by rotating a shaft 128 upon which arms 124 are secured, there is provided a handle 129 (Fig. 4) suitably connected to shaft 128.

For preventing reflection of light from the surface of image-carrying sheet 110, when it is in the position shown in Fig. 4, there is provided a pair of nonreflecting screens, comprising blade-like members 130 and 131, adapted to overlie the surface of sheet 110. Screen 130 is preferably secured to a rotatably mounted rod 132, which rod has an actuating arm 134 secured thereto. Screen 131 is preferably mounted on a similar rod and has a similar actuating mechanism (omitted in the drawing). Referring particularly to Fig. 4, screen 130 is normally maintained in the dotted line position by means of an off-centered biasing spring 136. When the arm 124 is swung, from the position shown in Fig. 3 to the position shown in Fig. 4, a stud 133, carried by the end thereof, engages arm 134 and swings arm 134 from the dotted line position in Fig. 4 to the full line position, thereby rotating screen 130 from the dotted line position to the full line position and thus covering half of the image-carrying sheet 110. A suitable movement of the other screen 131 covers the other half of the sheet 110. An indicator 86, identical with that shown in Figs. 1 and 2, shows proper positioning of sheet 110 on a plate 138.

For the purpose of processing the exposed photosensitive area, there is preferably provided a pair of pressure rolls 140 and 142 positioned adjacent a light-tight discharge opening 144. Roll 140 is preferably carried by housing 100 and may be mounted for movement away from roll 142 by operation of a suitable lever positioned outside of the camera. Roll 142 is preferably carried by rear door 104.

In the operation of the camera of Figs. 3 and 4, the rear door 104 is opened, thus separating rolls 140 and 142. The clip 116 associated with one film unit is positioned in the clip holder 115 and the leader portion 114 of the film unit is threaded between the rolls 140—142 and through the discharge opening 144. When the rear door 104 is closed, an envelope (not shown) may be removed preferably by first moving roll 140 slightly away from roll 142, and pulling the envelope between the rolls. Roll 140 is then returned to the position shown. The arm 104 is actuated to move hook 120 into engagement with tab 118 and then arm 124 is swung to the right so as to move the image-carrying sheet into the dotted line position shown in Fig. 3, the latter part of this movement swinging the screens 130 and 131 into superposition with the image-carrying sheet 110. Exposure is now made and the arm 124 is preferably rotated slightly upwardly so as to rotate screens 130 and 131 out of contact with the image-carrying sheet 110. The film unit is then advanced between rolls 140 and 142, such as by pulling on the leader 114, so as to cause the release of the liquid from the container 112 and the spreading of this liquid between the exposed photosensitive sheet and the surface of the image-carrying sheet. After a suitable time, such as a minute, the image-carrying sheet, having a positive image on its surface, is separated from the photosensitive sheet 108.

The camera of Figs. 3 and 4 may, if desired, have the lens 102 therefor positioned on the top wall of the camera, in which case the sheet 110 of the film unit would be the photosensitive sheet and would be moved into the focal plane when sheet 110 is brought down onto backing plate 138. With such a modification of the invention, the screens 130 and 131 could be mounted on rods whose axes were normal to plate 138. A right-angle drive between such rod and rod 132, for example, would permit the swinging of screens 130 and 131 into superposition with the image-carrying sheet held adjacent the door 104 as a result of operation of the actuating arm 134 by means of stud 133 carried on the end of swinging arm 124. Similarly, the camera of Figs. 1 and 2 may have its lens on the end of the camera instead of at the top as shown. In this case, the photosensitive layer is exposed while it is in the magazine, the backing plate 21 and spring 23 holding the photosensitive sheet flat in the focal plane. With such a modification of the invention, a screen similar to screen 130 of Figs. 3 and 4 may be swung from the right-hand end of the camera, as seen in Fig. 1, down into superposition with the image-carrying sheet when this sheet has been brought down onto plate 68. Such a screen may be actuated by the movement of rod 74, connected through a right-angle drive, to the rod supporting the screen.

The various pressure rolls have been shown as being rotated as a result of movement of a film unit therebetween. These rolls may, however, be operated by a crank, a spring motor or other suitable means, or other propelling means may be provided in addition to the pressure rolls.

While a preferred type of film unit has been described wherein the two sheets of the film unit have light-opaque strata, such is not an essential requirement of the invention. This is particularly true in those cases where a dark chamber is provided adjacent the discharge openings 84 and 144 respectively, or wherein a film unit is discharged into an envelope positioned adjacent these discharge openings.

While several preferred photographic processes have been mentioned above, the invention is not limited thereto. The photosensitive material may comprise photosensitive compounds other than silver halides, for example, diazonium compounds or ferric salts. Equally, the invention may be embodied in the form of an attachment to be added to existing cameras in place of the usual film pack or magazine holders supplied with such cameras. Although the invention has been shown in the preferred form as a hand-held camera, it is equally adaptable for use with large cameras, for example, large copying cameras or coin-controlled cameras wherein the sequence of operation of various elements of the camera may be controlled automatically, as by the insertion of a coin. Thus, the invention is equally useful for automatic portrait studios.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed, means providing a discharge opening through which said two sheets of a unit may be discharged in superposition from said camera, means for engaging a portion of one of said sheets and swinging said engaged sheet out of superposition with said other sheet while said other sheet is held stationary, lens means for exposing said photosensitive area when said sheets are out of superposition, a nonreflecting screen positionable between said image-carrying sheet and said lens means when said sheets are out of superposition, means for moving said screen into light-excluding relationship with respect to said image-carrying sheet, and means comprising a pair of pressure-applying surfaces mounted adjacent said discharge opening, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

2. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed, means providing a discharge opening through which said two sheets of a unit may be discharged in superposition from said camera, means for engaging a portion of one of said sheets and swinging said engaged sheet out of superposition with said other sheet while said other sheet is held stationary, lens means for exposing said photosensitive area when said sheets are out of superposition, a nonreflecting screen positionable between said image-carrying sheet and said lens means when said sheets are out of superposition, means for moving said screen into light-excluding relationship with respect to said image-carrying sheet, said last-named means being rendered operative, as the result of moving said engaging means, and means comprising a pair of pressure-applying surfaces mounted adjacent said discharge opening, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

3. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed, means for engaging a portion of one of said sheets and swinging said engaged sheet out of superposition with said other sheet while said other sheet is held stationary, lens means for exposing said photosensitive area when said sheets are out of superposition, a nonreflecting screen adjacent said holding means, means for moving said screen into superposition with said image-carrying sheet, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

4. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed, means for engaging a portion of said photosensitive sheet and swinging said photosensitive sheet out of superposition with said image-carrying sheet while said image-carrying sheet is held stationary and for moving said photosensitive sheet into exposure position in said camera, lens means for exposing said photosensitive area when said sheets are out of superposition, a nonreflecting screen adjacent said holding means, means for normally maintaining said screen rolled up, means for unrolling said screen, an operative connection between said sheet-moving means and said unrolling means to cause unrolling of said screen as a result of movement of said photosensitive sheet into exposure position, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

5. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed, means for engaging a portion of said photosensitive sheet and swinging said photosensitive sheet out of superposition with said image-carrying sheet while said image-carrying sheet is held stationary and for moving said photosensitive sheet into exposure position in said camera, lens means for exposing said photosensitive area when said sheets are out of superposition, a nonreflecting screen adjacent said holding means, means for normally maintaining said screen rolled up, means for unrolling said screen, an operative connection between said sheet-moving means and said unrolling means to cause unrolling of said screen as a result of movement of said photosensitive sheet into exposure position, said operative connection being arranged so as to be rendered operative during at least part of the movement of said moving means, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

6. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, means for holding said film unit with said photosensitive sheet and said image-carrying sheet superposed, means for engaging a portion of said photosensitive sheet and swinging said photosensitive sheet out of superposition with said image-carrying sheet while said image-carrying sheet is held stationary and for moving said photosensitive sheet into exposure position in said camera, lens means for exposing said photosensitive area when said sheets are out of superposition, a nonreflecting screen adjacent said holding means, means for normally maintaining said screen rolled up, means for unrolling said screen, means for rendering said unrolling means effective to cause said screen to be unrolled so as to be superposed with said image-carrying sheet, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

7. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, walls defining a camera body, means for holding said film unit with said photosensitve sheet and said image-carrying sheet superposed, means for engaging a portion of one of said sheets and swinging said engaged sheet out of superposition with said other sheet while said other sheet is held stationary, lens means for exposing said photosensitive area when said sheets are out of superposition, a nonreflecting screen positionable between said image-carrying sheet and said lens means when said sheets are out of superposition, means for moving said screen into light-excluding relationship with respect to said image-carrying sheet, said screen comprising a bladelike member normally positioned adjacent one wall of the camera body, means for rotating said bladelike screen around one edge thereof to cause said screen to move into superposition with said image-carrying sheet as said engaged sheet is moved to a position permitting exposure of said photosensitive area, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

8. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, walls defining a camera body, means for holding said film unit with said photosensitive sheet and said image-carrying sheet superposed and with said photosensitive sheet in exposure position in said camera, means for engaging a portion of said image-carrying sheet and swinging said image-carrying sheet out of superposition with said photosensitive area while said photosensitive sheet remains stationary in said exposure position, means for exposing said photosensitive area when said sheets are out of superposition, a non-reflecting screen, said screen comprising a blade-like member normally positioned adjacent one wall of the cambera body, means for rotating said bladelike screen around one edge thereof to cause said screen to move into superposition with said image-carrying sheet as said engaged image-carrying sheet is swung to a position permitting exposure of said photosensitive area, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

9. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, walls defining a camera body, means for holding said film unit with said photosensitive sheet and said image-carrying sheet superposed and with said photosensitive sheet in exposure position in said camera, means for engaging a portion of said image-carrying sheet and swinging said image-carrying sheet out of superposition with said photosensitive area while said photosensitive sheet remains stationary in said exposure position, means for exposing said photosensitive area when said sheets are out of superposition, a non-reflecting screen, said screen comprising a blade-like member normally positioned adjacent one wall of the camera body, means for rotating said bladelike screen around one edge thereof to cause said screen to move into superposition with said image-carrying sheet as said engaged image-carrying sheet is swung to a position permitting exposure of said photosensitive area, an operative connection between said sheet-swinging means and said screen-rotating means to cause rotation of said screen into superposition with said image-carrying sheet as a result of movement of said swinging means, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

10. Camera apparatus for use with a composite film unit, said unit comprising a photosensitive sheet including a photosensitive silver halide layer carried by a base, an image-carrying sheet superposed with an area of said photosensitive layer adapted to be exposed to light, and a container releasably confining a processing liquid and positioned between said sheets adjacent an edge of said area, one of said sheets being displaceable from superposition with the other sheet to permit exposure of said photosensitive area, said apparatus comprising, in combination, walls defining a camera body, means for holding said film unit with said photosensitive sheet and said image-carrying sheet superposed and with said photosensitive sheet in exposure position in said camera, means for engaging a portion of said image-carrying sheet and swinging said image-carrying sheet out of superposition with said photosensitive area while said photosensitive sheet remains stationary in said exposure position, means for exposing said photosensitive area when said sheets are out of superposition, a non-reflecting screen, said screen comprising a blade-like member normally positioned adjacent one wall of the camera body, means for rotating said bladelike screen around one edge thereof to cause said screen to move into superposition with said image-carrying sheet as said engaged image-carrying sheet is swung to a position permitting exposure of said photosensitive area, an operative connection between said sheet-swinging means and said screen-rotating means to cause rotation of said screen into superposition with said image-carrying sheet as a result of said swinging means, said operative connection being arranged so as to be rendered operative during only a part of the movement of said swinging means, and means comprising a pair of pressure-applying surfaces mounted adjacent said holding means, said surfaces being adapted to compress said film unit during advancement of said unit between said surfaces, progressive subjection of said composite unit to compression providing release of said processing liquid from said container and spreading of said liquid between facing surfaces of said exposed photosensitive sheet and said image-carrying sheet.

11. Camera apparatus for use with a composite film unit, said unit comprising a photosensitive sheet including a photosensitive silver halide layer carried by a base, and an image-carrying sheet superposed with an area of said photosensitive layer adapted to be exposed to light, one of said sheets being displaceable from superposition with the other sheet to permit exposure of said photosensitive area, said apparatus comprising, in combination, walls defining a camera body, means for holding said film unit with said photosensitive sheet and said image-carrying sheet superposed and with said photosensitive sheet in exposure position in said camera, means for engaging a portion of said image-carrying sheet and swinging said image-carrying sheet out of superposition with said photosensitive area while said photosensitive sheet remains stationary in said exposure position, means for exposing said photosensitive area when said sheets are out of superposition, a nonreflecting screen, said screen comprising a bladelike member normally positioned adjacent one wall of the camera body, means for rotating said bladelike screen around one edge thereof to cause said screen to move into superposition with said image-carrying sheet as said engaged image-carrying sheet is swung to a position permitting exposure of said photosensitive area, and means providing a discharge opening through which said two sheets of a unit may be discharged in superposition from said camera.

12. Camera apparatus for use with a composite film unit, said unit comprising a photosensitive sheet including a photosensitive silver halide layer carried by a base, and an image-carrying sheet superposed with an area of said photosensitive layer adapted to be exposed to light, one of said sheets being displaceable from superposition with said other sheet to permit exposure of said photosensitive area, said apparatus comprising, in combination, means for holding said film unit with said photosensitive sheet and said image-carrying sheet superposed, means for engaging a portion of said photosensitive sheet and swinging said photosensitive sheet out of superposition with said image-carrying sheet while said image-carrying sheet is held stationary and for moving said photosensitive sheet into exposure position in said camera, lens means for exposing said photosensitive area when said sheets are out of superposition, a nonreflecting screen adjacent said holding means, means for normally maintaining said screen rolled up, means for unrolling said screen, and an operative connection between said sheet-moving means and said unrolling means to cause unrolling of said screen as a result of movement of said photosensitive sheet into exposure position, said operative connection being arranged so as to be rendered operative during at least part of the movement of said moving means.

MURRY N. FAIRBANK.

No references cited.

Certificate of Correction

Patent No. 2,477,291

July 26, 1949

MURRY N. FAIRBANK

It is hereby certified that errors appear in the printed specification of the above numbered patent requiring correction as follows:

Column 1, line 18, for the word "shields" read *sheets*; column 5, line 63, for "rollers" read *collars*; column 13, line 24, for "cambera" read *camera*; and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*